United States Patent [19]
Veatch et al.

[11] Patent Number: 4,473,465
[45] Date of Patent: Sep. 25, 1984

[54] ELIMINATING FOAMING IN HYDROCARBON DISTILLATIONS

[75] Inventors: Fred C. Veatch, Newkirk; D. D. Orrell, Ponca City, both of Okla.

[73] Assignee: Conoco Inc., Ponca City, Okla.

[21] Appl. No.: 458,697

[22] Filed: Jan. 17, 1983

[51] Int. Cl.³ .................. C10G 7/00; B01B 1/02; B01D 3/00
[52] U.S. Cl. .................................. 208/348; 203/20
[58] Field of Search ............... 208/348; 252/307, 312, 252/321; 203/20

[56] References Cited
U.S. PATENT DOCUMENTS
2,748,089  5/1956  Monson .................... 252/321
2,993,867  7/1961  Wilson ...................... 203/20

Primary Examiner—Delbert E. Gantz
Assistant Examiner—Chung K. Pak
Attorney, Agent, or Firm—Cortlan R. Schupbach

[57] ABSTRACT

A method for eliminating foam in hydrocarbon distillation systems where the foaming is caused by an ionic surface-active substance is involved. Foam is eliminated by the addition of an effective amount of a surfactant electrolytically opposite to the surface-active material already in the system. The surfactant added and the surface-active substance already in the system complex to form a non-foaming combination, allowing distillation to proceed without foaming.

3 Claims, No Drawings

ELIMINATING FOAMING IN HYDROCARBON DISTILLATIONS

BACKGROUND OF THE INVENTION

Many crude oils contain surface-active materials that cause foam problems during distillation and prevent distillation from taking place. Often anti-foam agents such as ethylene glycol, propylene glycol, polyols, and $C_6$–$C_{20}$ straight chain alcohols are incapable of stopping the foaming to allow distillations to proceed. This is especially true when ionic surface-active substances cause the foaming.

Surfactants have the reputation of being foam-causing agents, although some surfactants have been described as having low foaming characteristics. U.S. Pat. No. 3,684,736 describes a low foaming surface-active composition. This cationic-anionic surfactant complex is used in an aqueous environment where surfactant characteristics are desired. A similar disclosure is found in U.S. Pat. No. 3,817,871. This patent teaches that the combination of certain cationic and anionic surfactants will yield another surfactant with superior surfactant characteristics which is suitable for solvent/water systems.

Ionic surface-active substances are frequently found in hydrocarbons which must be distilled. Such substances frequently cause foaming which prevents distillation from occurring. It would be advantageous to eliminate the foaming caused by such surface-active substances so that distillation could proceed.

Surprisingly, it has been discovered that surfactants, known for causing foaming, can be used to eliminate foam. It is an object of the instant invention to eliminate foaming problems caused by ionic surface-active materials in hydrocarbon distillations. Other objects will become apparent to those skilled in the art as this discussion proceeds.

SUMMARY OF THE INVENTION

Foam may be prevented and eliminated in hydrocarbon distillation systems when the foam is caused by ionic surface-active material in the hydrocarbon, by a method comprising: adding to the hydrocarbon which contains an ionic surface-active material an effective amount of an opposed charged ionic surfactant having a molecular weight in the range of from about 280 to 500, to form a non-foaming complex with the ionic surface-active material in the hydrocarbon, and distilling the hydrocarbon.

The foaming ionic surface-active material in the hydrocarbon can be a material that acts like a surface-active agent only in the hydrocarbon, or it can be a known surfactant.

In this process, ionic surfactants are used to act on the foam causing ionic surface-active material so that a non-foaming complex forms in the hydrocarbon. The surfactant added to the hydrocarbon must have an opposed charge. In addition to this, the surfactant added should have a molecular weight in the range of from about 280 to about 500.

DETAILED DESCRIPTION

Foaming caused by ionic surface-active material in hydrocarbon distillations can be avoided and controlled by the addition of a complexing ionic surfactant. Conditions required for this process relate to molecular weight, ionic surfactant concentration, and charge.

Ionic surfactants having a molecular weight range of from about 280 to about 500 will normally be used in the process of the instant invention but molecular weights of from about 320 to about 500 are preferred. Ionic surfactants within this range will have acceptable solubility in the hydrocarbon system even considering normal water contents. Such ionic surfactants will be stable at hydrocarbon distillation temperatures of from about 100° C. to about 600° C.

The ionic surfactant added to the hydrocarbon must be added in an effective amount. The effective amount can be determined by conventional methods such as the methylene blue procedure described by S. R. Epton *Nature* 160:795 (1947); *Trans. Feriday Soc.* 44:226 (1948). Using this procedure the amount of foam-causing ionic surface-active material already present in the hydrocarbon can be ascertained. When this information is obtained a stoichiometric amount of a surfactant in the correct molecular weight range having an opposed charge is added. The amount of ionic surfactant added is preferably but not critically within 0.01% by weight of the amount of foam-causing ionic surface-active material in the hydrocarbon.

An alternative empirical procedure which avoids the determination of the amount of ionic surface-active material in the hydrocarbon can be used. In such a method, gradual addition of small concentrations of an ionic surfactant is added to the foaming hydrocarbon until the foaming has been eliminated.

Ordinarily the type of an ionic character of the foam causing surface-active material in the hydrocarbon will be known. However, if the type is unknown, conventional methods of analysis can be used to determine the ionic character. One practical method to determine the character of the ionic surfactant is to add surfactant of a known charge to the foaming hydrocarbon. A decrease in foam indicates the surfactant has the necessary charges, whereas no decrease or an increase in foaming indicates that the unknown surfactant has the same charge as the added surfactant. Once the ionic character is known, an ionic surfactant having an opposed charge may be selected and added in a proper concentration. Representative but non-exhaustive examples of suitable cationic surfactants are cetyl pyridinium bromide, cetyl trimethyl ammonium bromide, hexa decyl trimethyl ammonium bromide and di-isobutylphenoxyethoxyethyldimethylbenzylammoniumchloridemonohydrate. Representative but non-exhaustive examples of anionic surfactans are alkyl benzene sulfonate, alkylaryl sulfonate, ethoxylated alcohol sulfates and alcohol sulfate. Mixtures and analogues of these materials can be used.

The invention is more completely described with reference to the example, where all parts and percentages are by weight unless otherwise specified. The example is provided to illustrate the present invention and not to limit it.

EXAMPLE

A crude oil which had produced such large amounts of foam that distillation was impossible was analyzed in the following manner;

A. to 4.5 grams of the crude was added 0.051 milliequivalents of lauryl sulfate (anionic surfactant).
B. The mixture of (A) was then titrated with Hyamine ®, a cationic surfactant, using the methylene blue procedure. The excess amount of lauryl sulfate found was 0.035 milliequivalents (meq.):

0.051 (added)−0.035 (found)=0.016 meq. of "cationic like" material in the crude. 0.016 meq. per 4.5 g of hydrocarbon=0.0036 meq./g, of cationic-like activity in the foaming crude oil to distill about 280 g of the "foaming", crude without foaming 1.07 meq. of anionic surfactant should be added.

An anionic surfactant slurry which was 59.4% alkylaryl sulfonate (molecular weight 430 and 1.38 meq./g was used.

1.07 meq./1.38 meq./g=0.78 g of alkylaryl sulfonate to be added.

0.78 of the anionic surfactant slurry were combined with 280 g of the foam-causing crude oil. The mixture was distilled. No foaming occurred.

While certain embodiments and details have been shown for the purpose of illustrating this invention, it will be apparent to those skilled in this art that various changes and modifications may be made herein without departing from the spirit or scope of this invention.

We claim:

1. A method for preventing foaming during distillation of hydrocarbon materials containing ionic surface-active materials comprising determining the amount and type of ionic surface-active material in said hydrocarbon, then adding a stoichiometric amount of an ionic surfactant having an opposite charge and a molecular weight in the range of from about 280 to about 500 to the hydrocarbon containing said ionic surface-active material to form a non-foaming complex in said hydrocarbon, and then distilling said hydrocarbon.

2. A method as described in claim 1 wherein an anionic surface-active material is in the hydrocarbon, and the added cationic surfactant is at least one material selected from the group consisting of:

cetyl pyridinium bromide, cetyl trimethyl ammonium bromide, hexa decyl trimethyl ammonium bromide and di-isobutylphenoxyethyldimethylbenzylammoniumchloridemonohydrate.

3. A method as described in claim 1 wherein a cationic surface-active material is in the hydrocarbon and the anionic surface-active material is at least one material selected from the group consisting of:

alkylbenzene sulfonate, alkylaryl sulfonate, ethoxylated alcohol sulfates and alcohol sulfate.

* * * * *